(12) United States Patent
Killian

(10) Patent No.: US 6,598,892 B1
(45) Date of Patent: Jul. 29, 2003

(54) TWO WHEEL STEERING BICYCLE WITH LATITUDINAL ALIGNED WHEELS

(76) Inventor: Michael Killian, 32 Westland Ave., Apt 16, Boston, MA (US) 02115

( * ) Notice: Subject to any disclaimer, the term of this patent is extended or adjusted under 35 U.S.C. 154(b) by 46 days.

(21) Appl. No.: 10/040,921

(22) Filed: Jan. 7, 2002

(51) Int. Cl.$^7$ ................................................ B62K 17/00
(52) U.S. Cl. ........................ 280/267; 280/266; 280/261
(58) Field of Search ................................. 280/266–269, 280/259, 261

(56) References Cited

U.S. PATENT DOCUMENTS 6,102,420 A * 8/2000 Hoeksta ...................... 280/267

* cited by examiner

Primary Examiner—Lesley D. Morris
Assistant Examiner—Matthew Luby

(57) ABSTRACT

A center support member connects the rear head tube to the front head tube. The rear wheel attaches to the rear fork extending upwards. The rear fork steerer column passes through the rear head tube and can rotate within the rear head tube by a bicycle bearing headset. A rear steering handle is connected to the rear fork steerer column. The rear steering handle is designed to contact the rider's lower arm and hand. The front wheel attaches to the front fork extending upwards. The front fork steerer column passes through the front head tube and can rotate within the front head tube by a bicycle bearing headset. A front steering handle is connected to the front fork steerer column. The front steering handle is designed to contact the rider's lower arm and hand. A rider support member attaches to the center support member extending downward. A bicycle saddle is attached to the rider support member in such a way as to position the rider facing perpendicular to the longitudinal axis of the center support member. A bicycle bottom bracket, front sprocket, left and right crank and pedals are attached to the bottom of the rider support member. The front sprocket is positioned perpendicular to the longitudinal axis of the center support member. The rider is positioned perpendicular to the longitudinal axis of the center support member. The rider's left arm is positioned at the user's left side and contacts the rear steering handle. The rider's right arm is positioned at the user's right side and contacts the front steering handle. The device moves forward to the rider's right. The saddle and steering handles should be adjusted so that the rider's body is roughly balanced across the vertical plane of the rear and front wheels. The device moves to the right and the rider keeps the device balanced by constantly correcting the coordinated rear and front steering systems. It may take some practice to make this correction reflex, but once mastered this device offers more control and artistic expression than a currently available bicycle.

5 Claims, 5 Drawing Sheets

TWO WHEEL STEERING BICYCLE WITH LATITUDINAL ALIGNED WHEELS

FIELD OF THE INVENTION

The present invention relates to recreational devices like bicycles.

BACKGROUND OF THE INVENTION

The invention relates to bicycles and comprises a support frame and two steerable wheels mounted in a latitudinal direction. More specifically, the present invention relates to bicycles which can be used to traverse smooth and rough terrain including mountain slopes.

Human balance can be considered in two separate axes. Human balance left side to right side and human balance front to back. Left to right human balance is relatively inaccurate; as evidenced by trying to stand on one foot. However since the human body has two feet there is a constant correcting mechanism by moving ones hips and upper body relative to both left and right foot. This endless correction makes left to right balance very useful for walking and standing. Devices based on human left to right balance, like the bicycle tap into this constant correcting mechanism. A bicycle is in a constant state of losing its balance and with the endless correcting of the front wheel it is kept in balance. People learn to ride a bicycle because this constant correcting is much like the person's natural left to right correction mechanism.

Front to back balance is in many ways much more accurate as evidenced by the operation of the ankle and foot as you lean slightly forward. There is none of the left to right instability as when you stand on one foot. The big difference in front to back balance is that it has leverage much closer to the ground for correcting balance; namely the ankle and foot. This means that the balance correction is quicker for front to back balance. One simply has to apply pressure on his/her soles or heels. Rarely is upper body weight shifting involved in front to back balance correction.

Devices that leverage front to back balance include snowboards and to a lesser extent skateboards. In both cases balance is restored by pushing down on ones toes with respect to ones heels or lifting ones toes. This action in a snowboard causes the board to carve into the snow in a forward or rearward direction and thus recovering balance. These actions in a skateboard causes the truck to change the relative orientation of the rear axle with respect to the front axle and turning toward the front or towards the rear and again regaining balance. Snowboards and skateboards traveling at high speed tend to be difficult to control and are better suited to slow speed artistic expression. This is because the length of a person's foot is relatively short when compared with the distance between left and right foot with feet apart.

Devices that leverage left to right balance include currently available bicycles.

The present invention discloses a two wheel steering bicycle with latitudinal aligned wheels. This will leverage human front to back balance primarily with left to right balance having only secondary input. The user sits on a saddle connected to the center support frame portion and balances the device by continuously correcting the orientation of the left and right wheel with his/her left and right arm respectively. The user's body faces perpendicular to the direction of motion. The saddle and left and right steering handles should be adjusted to position the user's body to roughly balance the left to right center axis of the device. The user's left forearm is held roughly horizontal at the user's left side and contacts the left wheel steering handle. The user's right forearm is held roughly horizontal at the user's right side and contacts the right wheel steering handle. When the user feels himself/herself falling forward out of balance, the user moves his/her arms in such a way as to bring his/her hands closer together which steers each wheel in such a way as to track the device forward of the original line of motion and thus regaining balance. The user must be in a state of constant correction which with practice will become natural and reflex. This device moves the user in a sideways direction and preferably the device will be configured to move to the right. A version of the current invention can also be configured to move to the left. The center support frame is configured with a saddle and a means of powering the device. Preferably the means of propelling the device is a regular bicycle front sprocket, crank and pedals driving a bicycle chain connected to the rear wheel. The device could also be configured with a linear drive system. Propelling the device requires actions similar to a regular bicycle. The user moves the pedals in a circular motion which drives the drive chain and the rear wheel. Once the user has mastered the basics of propulsion and turning the user can start introducing his/her weight into the turns by leaning into the turns. The feedback from this device is strongest when the user uses his/her weight. This device may not compete with a regular bicycle with respect to distance traveled or speed of operation. However it is expected that this invention will excel at carving turns and will work best on open paved areas or grass slopes. It is expected that this invention will be more expressive than a regular bicycle and will reward the operator with much positive feedback of having mastered his/her balance.

SUMMARY OF THE INVENTION

It is an object of the present invention to provide a two wheel steering bicycle with latitudinal aligned wheels.

It is a more particular object of the invention to provide a center support frame member and rider support member with saddle and drive mechanism. The saddle positions the rider perpendicular to the longitudinal axis of the center support member.

It is an object of the present invention to provide front and rear bicycle head tubes attached to each end of the center support frame member.

It is an object of the present invention to provide front and rear wheels supported by forks whose steerer columns extend through respective bicycle headsets and front and rear head tubes.

Each fork steerer column attaches to an associated steering handle.

Each steering handle includes means of contact with the user's forearm and hand.

DESCRIPTION OF THE DRAWINGS

These and other aspects of the present invention will become more evident upon reading the following description of the preferred embodiment in conjunction with the accompanying drawings, in which.

DETAILED DESCRIPTION OF PREFERRED EMBODIMENTS

Figure 1:
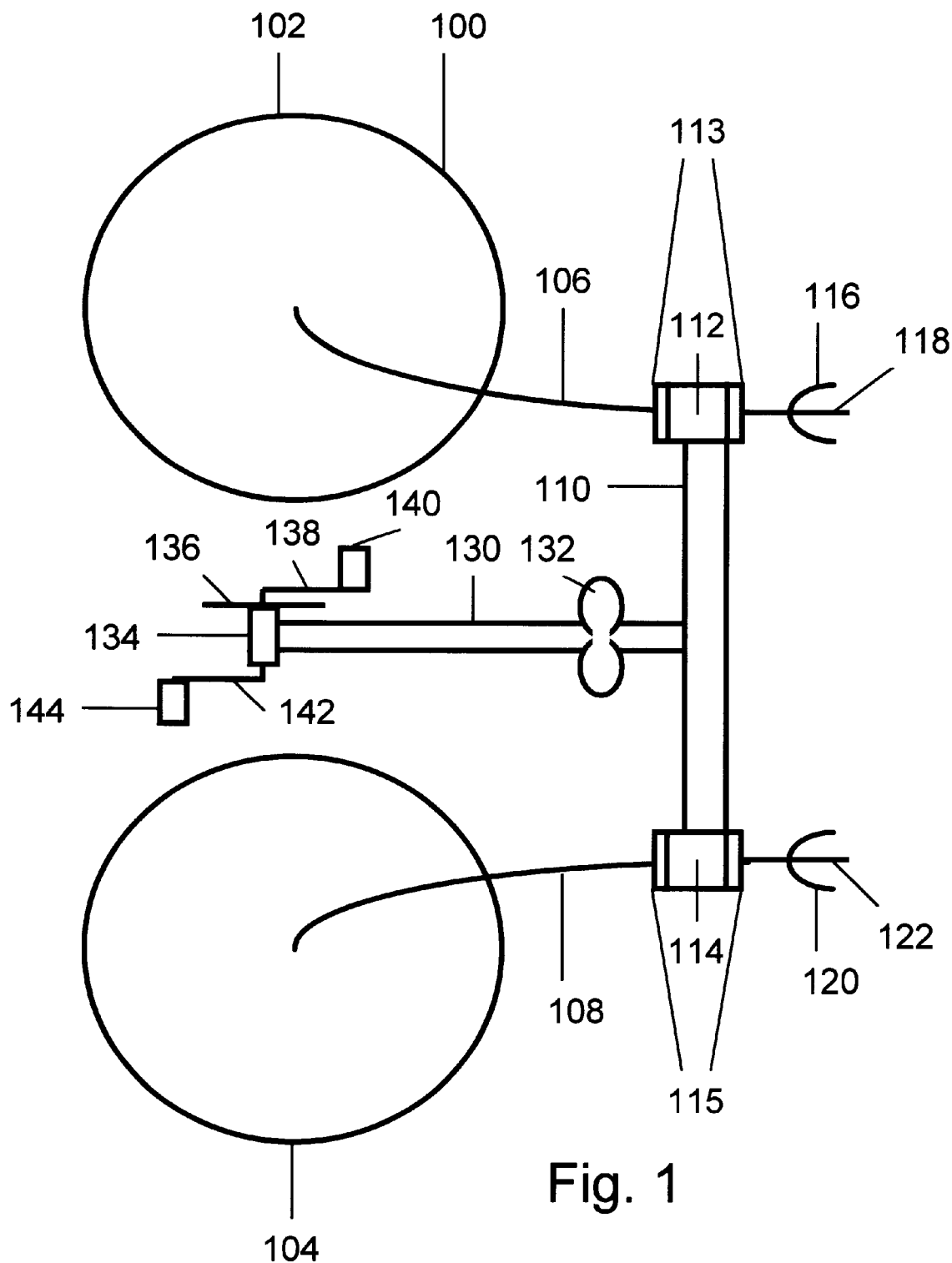
FIG. 1 is a side view of the current invention where the rider's back would be visible.

FIG. 1 illustrates the current invention 100. In FIG. 1 rear wheel 102 and front wheel 104 support rear fork 106 and front fork 108 respectively from the ground. Center support member 110 connects to rear head tube 112 and front head tube 114. The steerer column of rear fork 106 extends through rear headset 113 and rear head tube 112 to connect with rear steering handle forearm portion 116 and rear steering handle hand portion 118. The steerer column of front fork 108 extends through front headset 115 and front head tube 114 to connect with front steering handle forearm portion 120 and rear steering handle hand portion 122. Rider support member 130 connects to center support member 110. Saddle 132 connects to rider support member 130. Bicycle bottom bracket 134 connects to rider support member 130. Bicycle front sprocket 136, left crank 138 and left pedal 140 connect to the left side of bicycle bottom bracket 134. Bicycle right crank 142 and right pedal 144 connect to the right side of bicycle bottom bracket 134.

Figure 2:
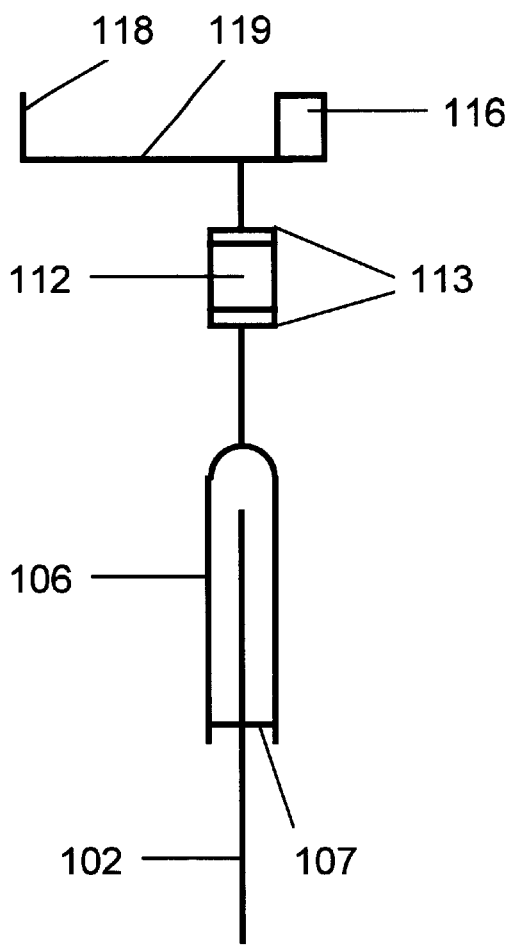
FIG. 2 is a rear view of a portion of the current invention detailing the rear wheel, rear fork, rear head tube, rear headset and rear steering handle.

FIG. 2 is a rear view of a portion of the current invention 100. In FIG. 2 rear wheel 102 is connected to rear fork 106 at axle 107. The steerer column of rear fork 106 extends through rear headset 113 and rear head tube 112 to rear steering handle 119. Rear steering handle forearm portion 116 connects to rear steering handle 119. Rear steering handle hand portion connects to rear steering handle 119.

Figure 3:
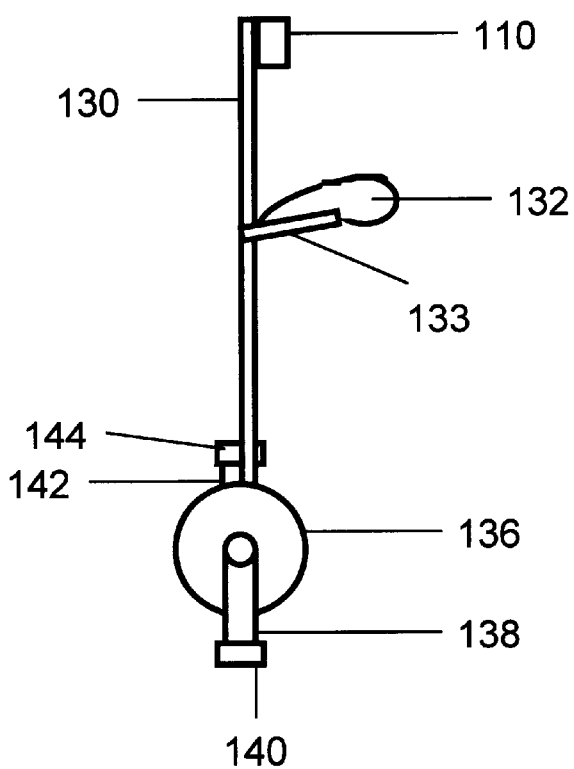
FIG. 3 is a side view of a portion of the current invention detailing the center support frame member; rider support member; saddle and drive mechanism.

FIG. 3 is a rear view of a portion of the current invention 100 detailing the rider support member 130. In FIG. 3 the rider support member 130 is connected to center support member 110. Saddle 132 is connected to rider support member 130 via saddle support member 133. Bicycle front sprocket 136, left crank 138 and left pedal 140 connect to the left side of rider support member 130. Right crank 142 and right pedal 144 connect to the right side of rider support member 130.

Figure 4:
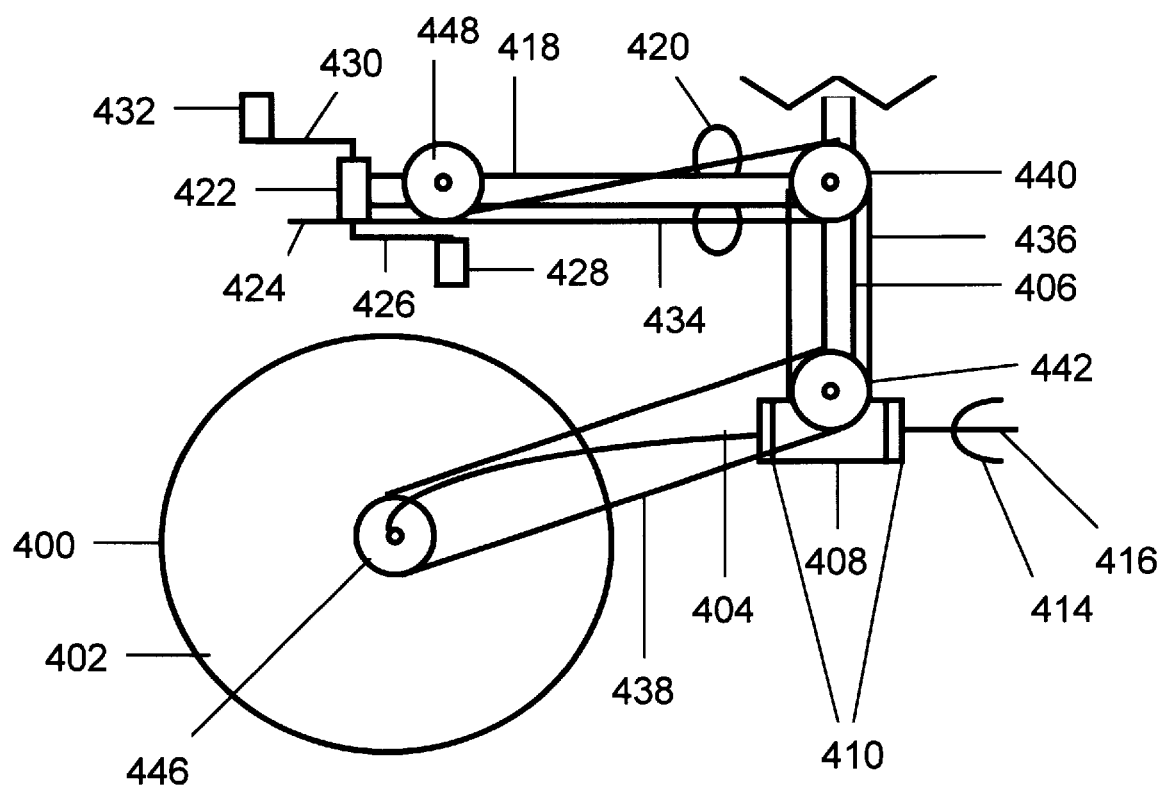
FIG. 4 is a side view of a portion of the current invention where the operator's front would be visible, detailing the routing of the drive chain.

FIG. 4 illustrates a portion of the current invention 400 which illustrates the drive chain routing. In FIG. 4 rear wheel 402 supports rear fork 404 from the ground. Center support member 406 connects to rear head tube 408. The steerer column of rear fork 404 extends through rear headset 408 and rear head tube 406 to connect with rear steering handle forearm portion 414 and rear steering handle hand portion 416. Rider support member 418 connects to center support member 406. Saddle 420 connects to rider support member 418. Bicycle bottom bracket 422 connects to rider support member 418. Bicycle front sprocket 424, left crank 426 and left pedal 428 connect to the left side of bicycle bottom bracket 422. Bicycle right crank 430 and right pedal 432 connect to the right side of bicycle bottom bracket 422. Chain loop one 434, chain loop two 436 and chain loop three 438. are used to transfer power from the drive mechanism to the rear wheel 402. Double sprocket one 440 and double sprocket two 442 are used to transfer motion between chain loop one 434, chain loop two 436 and chain loop three 438. Chain loop three 438 drives rear wheel sprocket 446 attached to rear wheel 402. The plane of bicycle front sprocket 424 and double sprocket one 440 are perpendicular to each other. Chain loop one 434 runs between bicycle front sprocket 424 and double sprocket one 440 by means of guide pulley 448 which keeps chain loop one 434 from jumping from bicycle front sprocket 424.

Figure 5:
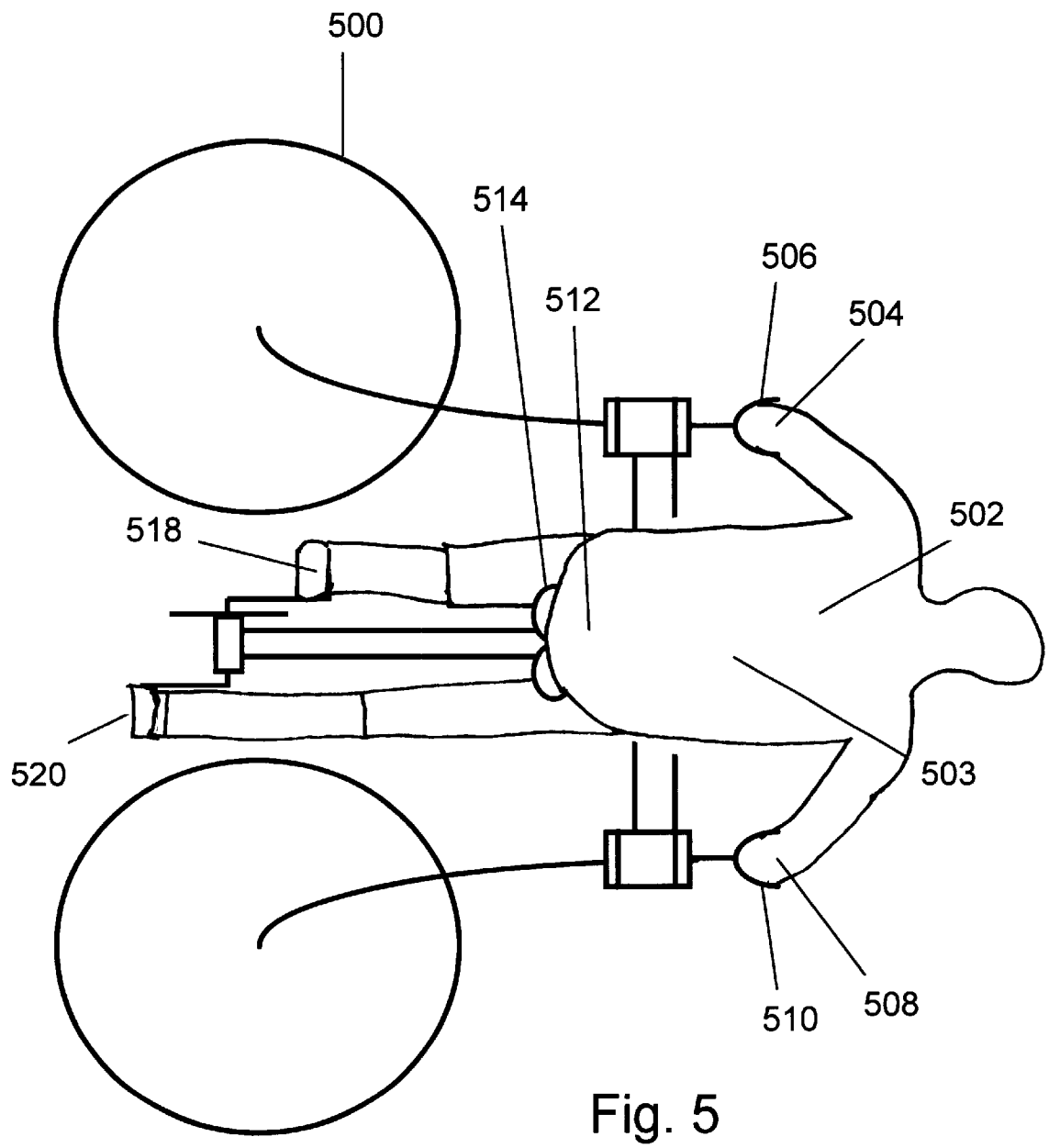
FIG. 5 is a side view of a user riding the current invention where the user's back is visible.

FIG. 5 illustrates a rider 502 riding the current invention 500. In FIG. 5 the rider's back 503 is illustrated. The rider's left elbow 504 is seen protruding from left steering handle forearm member 506. The rider's right elbow 508 is seen protruding from right steering handle forearm member 510. The rider's seat 512 rests on saddle 514. The rider's left foot 516 is positioned on the left pedal of the invention 500. The rider's right foot 518 is positioned on the right pedal of the invention 500.

Figure 6:
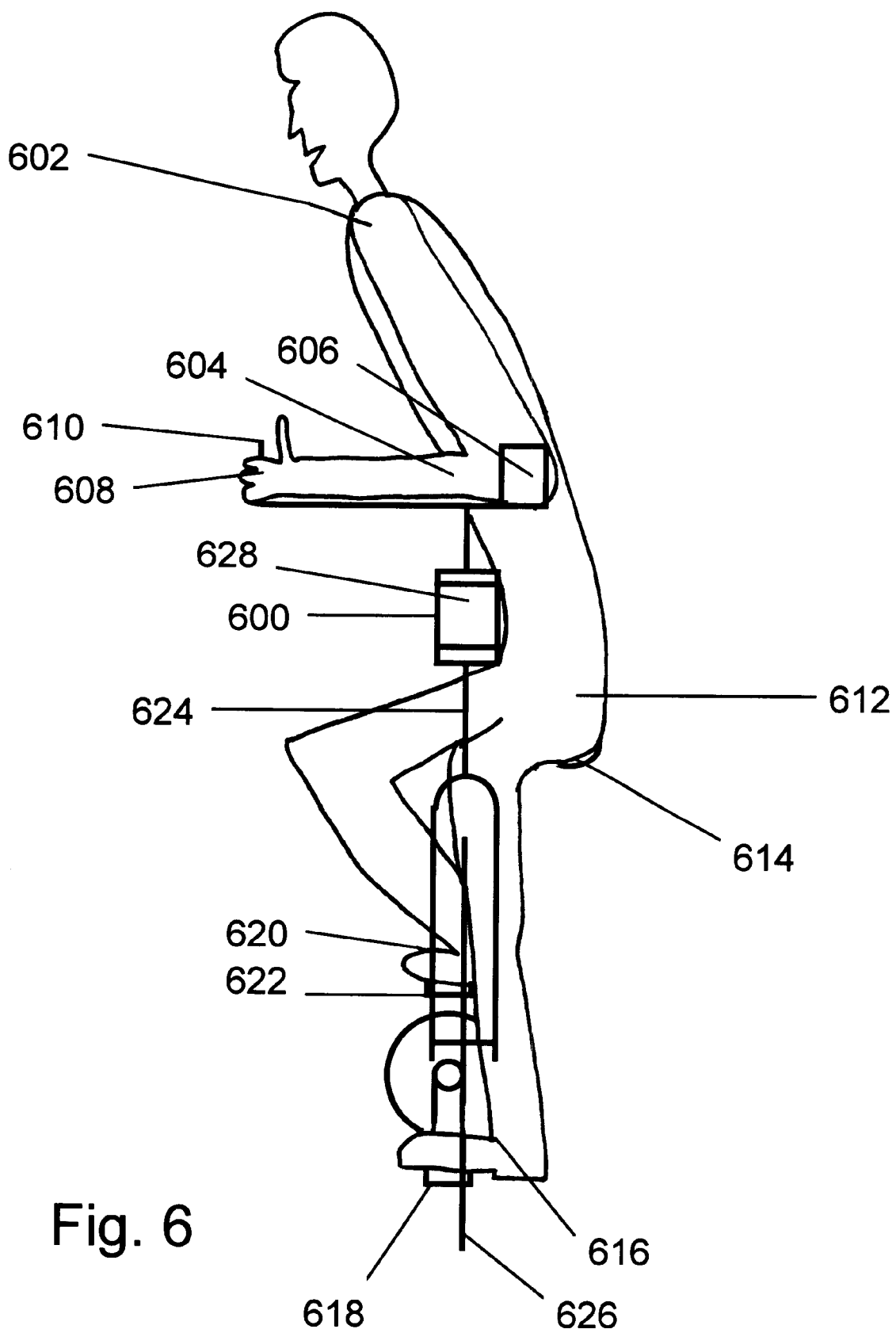
FIG. 6 is a rear view of a user riding the current invention where the user's left side is visible.

FIG. 6 illustrates the side view of rider 602 riding the current invention 600. In FIG. 6 the rider's left side is illustrated. The rider's left forearm 604 contacts the left steering handle forearm member 606. The rider's left hand 608 grips the left steering handle hand grip 610. The rider's seat 612 rests on saddle 614. The rider's left foot 616 is positioned on the left pedal 618. The rider's right foot 620 is positioned on the right pedal 622. Left fork 624, left wheel 626 and left head tube 628 are also illustrated. It should be noted that rider 602 is roughly balanced across the plane of left wheel 626.

I claim:

1. A two wheel steering bicycle comprising:

a center support member;

a rear head tube member connected to said center support member;

a rear headset member;

a front head tube member connected to said center support member;

a front headset member;

a rear fork member that extends upward with said fork member steerer column pivotably mounted within said rear head tube member using said rear headset member;

a single rear wheel being rototably mounted on said rear fork member;

a front fork member that extends upward with said fork member steerer column pivotably mounted within said front head tube member using said front headset member;

a single front wheel being rototably mounted on said front fork member;

a rear steering member connected to said rear fork member;

a front steering member connected to said front fork member;

a rider support member connected to the said center support member and extending downward;

a saddle connected to said rider support member wherein:
said saddle orients the rider facing perpendicular to the vertical plane intersecting the center of
said rear head tube member and said front head tube member;

a pedal mechanism connected to said rider support member including means of transferring rotational energy from said pedal mechanism to said rear wheel.

2. The two wheel steering bicycle according to claim 1, wherein said front and rear steering members include:
   a hand grip member that the rider's hand grips;
   a forearm grip member that contacts the rider's forearm adjacent to the rider's elbow.

3. The two wheel steering bicycle according to claim 2, wherein said pedal mechanism include:
   chain and cogs for transferring rotational energy from said pedal mechanism to said rear wheel.

4. A two wheel steering bicycle with rider mounted upright facing perpendicular to the direction of motion comprising:
   a center support member;
   a rear head tube member connected to said center support member;
   a rear headset member;
   a front head tube member connected to said center support member;
   a front headset member;
   a rear fork member that extends upward with said fork member steerer column pivotably mounted within said rear head tube member using said rear headset member;
   a single rear wheel being rototably mounted on said rear fork member;
   a front fork member that extends upward with said fork member steerer column pivotably mounted within said front head tube member using said front headset member;
   a single front wheel being rototably mounted on said front fork member;
   a rear steering member connected to said rear fork member;
   a front steering member connected to said front fork member;
   a rider support member connected to the said center support member and extending downward;
   a saddle connected to said rider support member.

5. The two wheel steering bicycle with rider mounted upright facing perpendicular to the direction of motion according to claim 1, wherein said front and rear steering members include:
   a hand grip member that the rider's hand grips;
   a forearm grip member that contacts the rider's forearm adjacent to the rider's elbow.

* * * * *